United States Patent
Hofmann et al.

(10) Patent No.: US 7,513,095 B2
(45) Date of Patent: Apr. 7, 2009

(54) FIVE-SECTION ROTARY MOWER

(75) Inventors: Todd Hofmann, Saskatoon (CA); Vincent Collstro, Saskatoon (CA)

(73) Assignee: Schulte Industries Ltd., Saskatchewan (CA)

( * ) Notice: Subject to any disclaimer, the term of this patent is extended or adjusted under 35 U.S.C. 154(b) by 0 days.

(21) Appl. No.: 11/537,780

(22) Filed: Oct. 2, 2006

(65) Prior Publication Data

US 2007/0119139 A1      May 31, 2007

(30) Foreign Application Priority Data

Nov. 25, 2005   (CA)   ................................ 2527792

(51) Int. Cl.
    *A01D 75/30*    (2006.01)
    *A01D 34/00*    (2006.01)
(52) U.S. Cl. ................................ 56/6; 56/13.6; 56/228
(58) Field of Classification Search ................ 56/13.5, 56/13.6, 228, 6, 10.2 R, 10.3, 11.8, 14.9, 56/15.1–15.3, 16.9, 234, 254, 320.1
    See application file for complete search history.

(56) References Cited

U.S. PATENT DOCUMENTS

| | | | | |
|---|---|---|---|---|
| 2,682,740 A * | 7/1954 | Miller et al. | ....................... | 56/6 |
| 2,753,674 A * | 7/1956 | Cunningham, Jr. et al. | ........ | 56/6 |
| 3,070,938 A * | 1/1963 | Winget | ............................. | 56/6 |
| 3,473,302 A * | 10/1969 | Caldwell | ......................... | 56/6 |
| 3,500,619 A * | 3/1970 | Bacon | ............................. | 56/6 |
| 3,736,735 A * | 6/1973 | Kulak et al | .................... | 56/13.6 |
| 4,178,744 A * | 12/1979 | Allely et al. | .................. | 56/16.2 |
| 4,178,746 A * | 12/1979 | Allely | ............................. | 56/53 |
| 4,192,123 A * | 3/1980 | Allely | ......................... | 56/13.6 |
| 4,538,400 A * | 9/1985 | Hottes | ......................... | 56/11.8 |
| 4,867,245 A * | 9/1989 | Stevens | ....................... | 172/311 |
| 4,912,915 A * | 4/1990 | Smit | ............................... | 56/6 |
| 5,031,389 A * | 7/1991 | Yawn et al. | ...................... | 56/6 |
| 5,113,640 A * | 5/1992 | Colistro | ......................... | 56/6 |
| 5,127,214 A * | 7/1992 | Colistro | ......................... | 56/6 |
| 5,241,808 A * | 9/1993 | Colistro | ......................... | 56/6 |
| 5,321,938 A * | 6/1994 | LeBlanc | ......................... | 56/6 |
| 5,771,669 A * | 6/1998 | Langworthy et al. | ............. | 56/6 |
| 6,367,562 B1 * | 4/2002 | Mosdal | ......................... | 172/311 |
| 6,546,707 B2 * | 4/2003 | Degelman et al. | ............. | 56/15.2 |
| 6,647,705 B2 * | 11/2003 | Ewanochko et al. | ......... | 56/15.2 |
| 2002/0189223 A1 * | 12/2002 | Degelman et al. | ............. | 56/15.2 |
| 2004/0148917 A1 * | 8/2004 | Eastwood | ........................ | 56/6 |
| 2005/0150326 A1 * | 7/2005 | Daniel | ....................... | 74/665 C |
| 2007/0169950 A1 * | 7/2007 | Grieshop | .................... | 172/311 |

* cited by examiner

*Primary Examiner*—Thomas B Will
*Assistant Examiner*—Joan D Misa
(74) *Attorney, Agent, or Firm*—Stites & Harbison PLLC; Ross F. Hunt, Jr.

(57) ABSTRACT

A rotary mower apparatus includes a center section with a center blade, inner wings with inner and middle blades, and outer wings with outer blades. Rear wheels support rear ends of the decks, and gauge wheels support front portions of the outer wings. A transport mechanism folds the outer wings upward to a transport position over the inner wings, and then folds the inner wings to a transport position upright from outer edges of the center section. A drive is operative to rotate each blade. Beneficially axes of the blades are oriented alternately forward and rearward across a width of the apparatus. A disclosed drive has a main gear box adapted at an input thereof for attachment to a rotating power source, and slip clutch protected power shafts are connected to outputs of the main gear box to drive the blades.

14 Claims, 4 Drawing Sheets

FIVE-SECTION ROTARY MOWER

This invention is in the field of rotary mowers and in particular such mowers that include wings for improved terrain following and narrow transport configurations.

BACKGROUND

Rotary mowers are well known for use in road-side maintenance, agriculture, and general grounds maintenance activities. Rotary mowers comprise a substantially horizontally oriented deck with a blade rotatably attached to a bottom side of the deck by a shaft extending through the deck to a blade gear box on top of the deck. The blade typically comprises a rotating blade bar or blade pan with blade knives pivotally attached thereto. A power shaft is connected to the input of the blade gear box to rotate the blade.

In many situations it is desirable to have as wide a mower as possible, for example for mowing large areas such as airports, agricultural fields, and the like. Thus mowers have thus been developed that have three decks comprising wings pivotally attached to a center section. This configuration provides improved ground following and a more even cut across the width of the mower compared to a wide rigid mower. A narrow transport width is provided as well by folding the wings up to a substantially vertical orientation along each side of the center section. In order to transport such a mower along roadways in many jurisdictions the transport width must be no greater than 3 meters. Height restrictions also often apply.

Such wing mowers typically include a single rotating blade on a center section, and the widest available mowers have two rotating blades on each wing. The blades are oriented typically in a V-configuration with the center blade nearest the front of the mower, the inner wing blade on each side slightly rearward of the center blade, and the outer wing blades slightly rearward of the inner wing blades. In order to provide some overlap to avoid misses, the rotational axes of one blade must be forward or rearward of the adjacent blades. It is also known to configure a three section mower with the center blade back near the rear of the mower, the inner wing blades forward, and the outer wing blades back again in a W-configuration.

A tractor towing the three section mower is connected by a power take off (pto) shaft to a main gear box, and then the main gear box typically has three outputs, each connected to a power shaft. A center power shaft is connected to a center gear box driving the center blade, and right and left power shafts are connected to corresponding right and left intermediate gear boxes driving the corresponding right and left inner wing blades, which intermediate gear boxes in turn each include another output connected to a power shaft driving an outer gear box and the outer blades.

The power shafts from the gear boxes typically include slip clutches to protect the drive train. Such slip clutches are designed such that when the blade strikes an obstruction, the clutch will slip and thus reduce damage to the drive train and the blade. The slip clutch will be set from the factory, or in some cases can be set in the field by tightening or loosening them, to transmit sufficient torque through the shaft to drive the blade during normal working conditions, but if the torque requirement climbs to a slipping point, such as when the blade hits a rock, the clutch will slip and the blade will stop. Typically the slipping point will be about 100% above the normal load to avoid constant slipping and poor cutting performance. On a typical mower the torque requirement during normal operations could be about 600 Newton-meters (NM), such that the slip clutch was set to slip at 1200 NM. Thus where the torque requirement on the shaft increases by 600 NM, the clutch will slip.

Typically the pto shaft from the tractor to the main gear box will not have a slip clutch, as the power shafts from the main gear box include slip clutches to provide the required protection. Thus the power shaft from the main gear box to the center gear box, and corresponding slip clutch, drives only the center blade, The power shafts from the main gear box to the right and left intermediate gear boxes, and corresponding slip clutches on each, are however required to drive both the inner and outer wing blades. Thus each slip clutch must be set to transmit sufficient torque through the shaft to drive two blades during normal operations.

For a typical mower the torque requirement during normal operations could be about 1200 Newton-meters (NM) for two blades, such that the slip clutch was set to slip at 2400 NM. Thus when one of the inner wing blades hits an obstruction, the torque requirement must climb by 1200 NM in order to cause the clutch to slip, reducing protection for the inner wing blade and drive line. The slip clutch can be loosened to reduce the torque at which same will slip, however there is then a risk of poor performance. The outer wing blade, like the center blade, is driven by a slip clutch on a shaft driving only that blade, so it is not affected by this problem.

Adding another blade outside the outer wing to make a wider mower would require adding an output to the outer gear box, and another power shaft to drive the outside blade. This would require that the power shafts from the main gear box to the right and left intermediate gear boxes, and corresponding slip clutches on each, drive the inner, outer, and outside blades, or three blades, exacerbating the problem significantly.

Other types of protection could be provided, such as providing a slip clutch in the short drive shaft down from each gear box to the blade being driven, however slip clutches are preferred for reasons of economy, convenience, and the like, and the reduced protection is not prohibitive in a three section mower, affecting only the inner wing blades.

Such mowers have been limited in width to about 8.5 meters. The width of the center section is limited by the transport width, and height restrictions limit the overall length of the wings which upward from the sides of the center section. Stability issues arise as well when the upright wings are excessively high.

Other towed implements, such as agricultural ground working implements such as cultivators and the like, have been extended to wider widths by adding outer wings to the inner wings to create a five section implement. This is relatively straightforward with implements that do not require a mechanical rotating drive train out to the outside wings. Where such a drive train is required as is the case for rotary mowers, significant problems arise in providing a suitable drive train that can power the outside rotor, provide satisfactory driveline protection, and at the same time fold into a satisfactory transport width.

SUMMARY OF THE INVENTION

It is an object of the present invention to provide a rotary mower that overcomes problems in the prior art.

In a first embodiment the invention provides a rotary mower apparatus for operation in an operating travel direction. The apparatus comprises a center section comprising a center deck and a center blade mounted under the center deck and driven through a center gear box mounted on the center deck. Right and left inner wings comprise right and left inner wing decks pivotally attached at inner edges thereof to corresponding right and left outer edges of the center section, and inner and middle blades mounted under each of the right and left inner wing decks and driven through corresponding inner and middle gear boxes mounted on the inner wing decks. Right and left outer wings comprise right and left outer wing decks pivotally attached at inner edges thereof to corresponding right and left outer edges of the right and left inner wings, and an outer blade mounted under each of the right and left outer wing decks and driven through outer gear boxes mounted on the outer wing decks. A plurality of rear wheels is operative to support rear ends of the decks. A transport mechanism is operative to fold the outer wings upward to a transport position over the inner wings, and operative to then fold the inner wings to a transport position oriented substantially upright from outer edges of the center section. A drive is operative to rotate each blade.

In a second embodiment the invention provides a rotary mower apparatus for operation in an operating travel direction. The apparatus comprises a center section comprising a center deck and a center blade mounted under the center deck and driven through a center gear box mounted on the center deck; inner wings comprising inner wing decks pivotally attached at inner edges thereof to corresponding outer edges of the center section, and inner and middle blades mounted under each of the inner wing decks and driven through corresponding inner and middle gear boxes mounted on the inner wing decks; and outer wings comprising outer wing decks pivotally attached at inner edges thereof to corresponding outer edges of the inner wings, and an outer blade mounted under each of the outer wing decks and driven through outer gear boxes mounted on the outer wing decks. Axes of the blades are oriented alternately forward and rearward across a width of the apparatus. A plurality of rear wheels support rear ends of the decks and gauge wheels are operative to support front portions of the outer wings. A transport mechanism is operative to fold the outer wings upward to a transport position over the inner wings, and operative to then fold the inner wings to a transport position oriented substantially upright from outer edges of the center section. A main gear box is adapted at an input thereof for attachment to a rotating power source, and includes a plurality of outputs, and each of a plurality of power shafts is connected to an output of the main gear box and is operative to drive at least one blade.

The rotary mower apparatus can be configured with the blades oriented alternately forward and rearward across a width of the apparatus so that overlap is achieved, and the overall length of the apparatus is minimized to improve maneuverability. Configuring the blades with the center blade forward, the inner blades rearward, the middle blades forward, and the outer blades rearward such that four of the seven blades are spaced along a rear discharge area of the apparatus will give the most even spread of cut material. Locating the center blade forward also reduces the distance between the main gear box and the center gear box, beneficially reducing the length of the center power shaft.

The drive can be configured such that each blade is protected by a slip clutch, as is required to protect the blades and driveline, and yet no slip clutch is required to drive more than two blades. Transmitting sufficient torque to drive three blades through a single slip clutch reduces the effectiveness of the slip clutch to provide protection and presents difficulties in setting the slipping point of the slip clutch. Prior art mowers drive two blades with a single slip clutch, and though somewhat problematic, such configurations have proven workable in the prior art.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
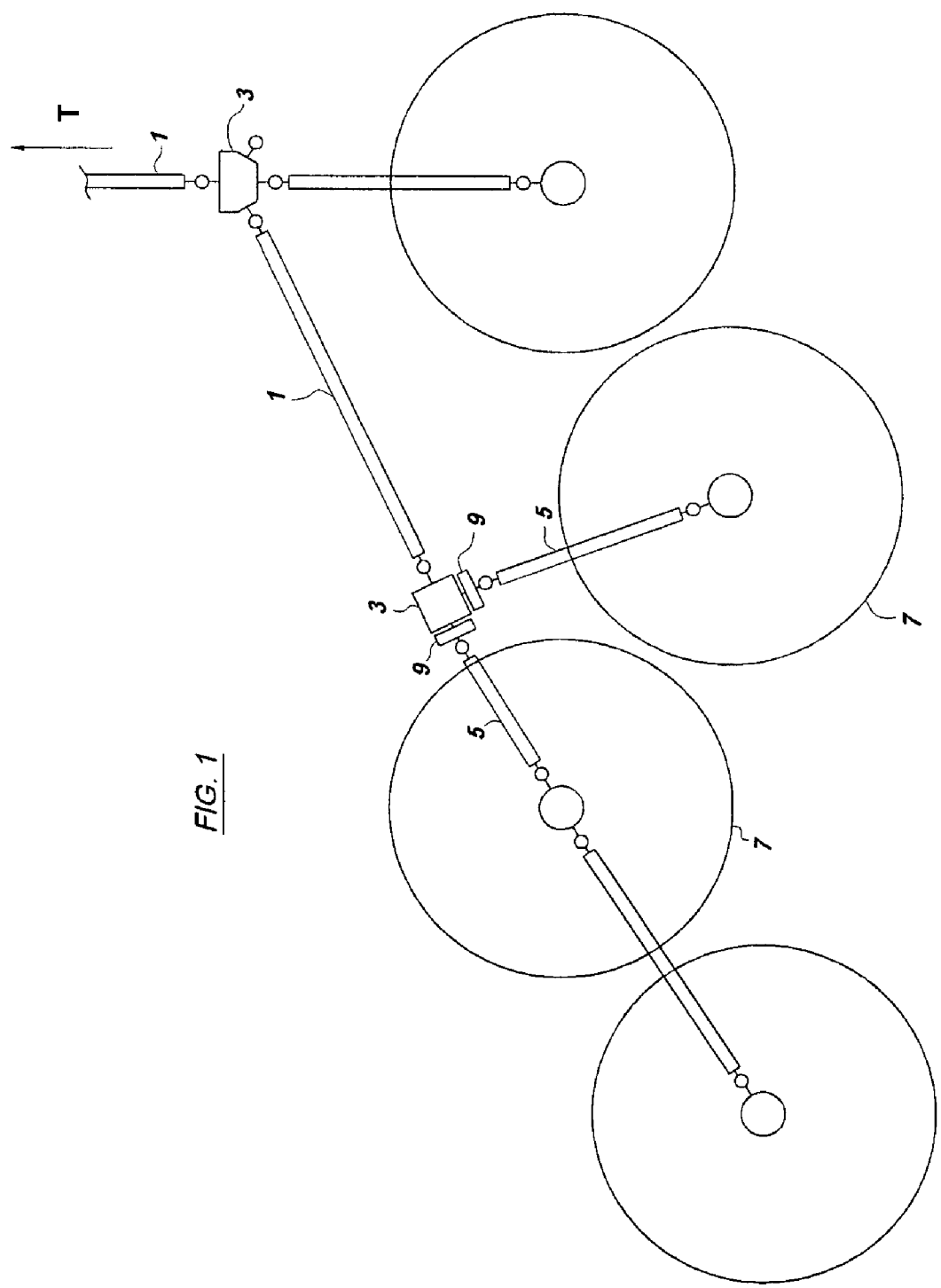
FIG. 1 is a top view of an embodiment of a rotary mower apparatus of the invention connected to a towing tractor.
Figure 2:
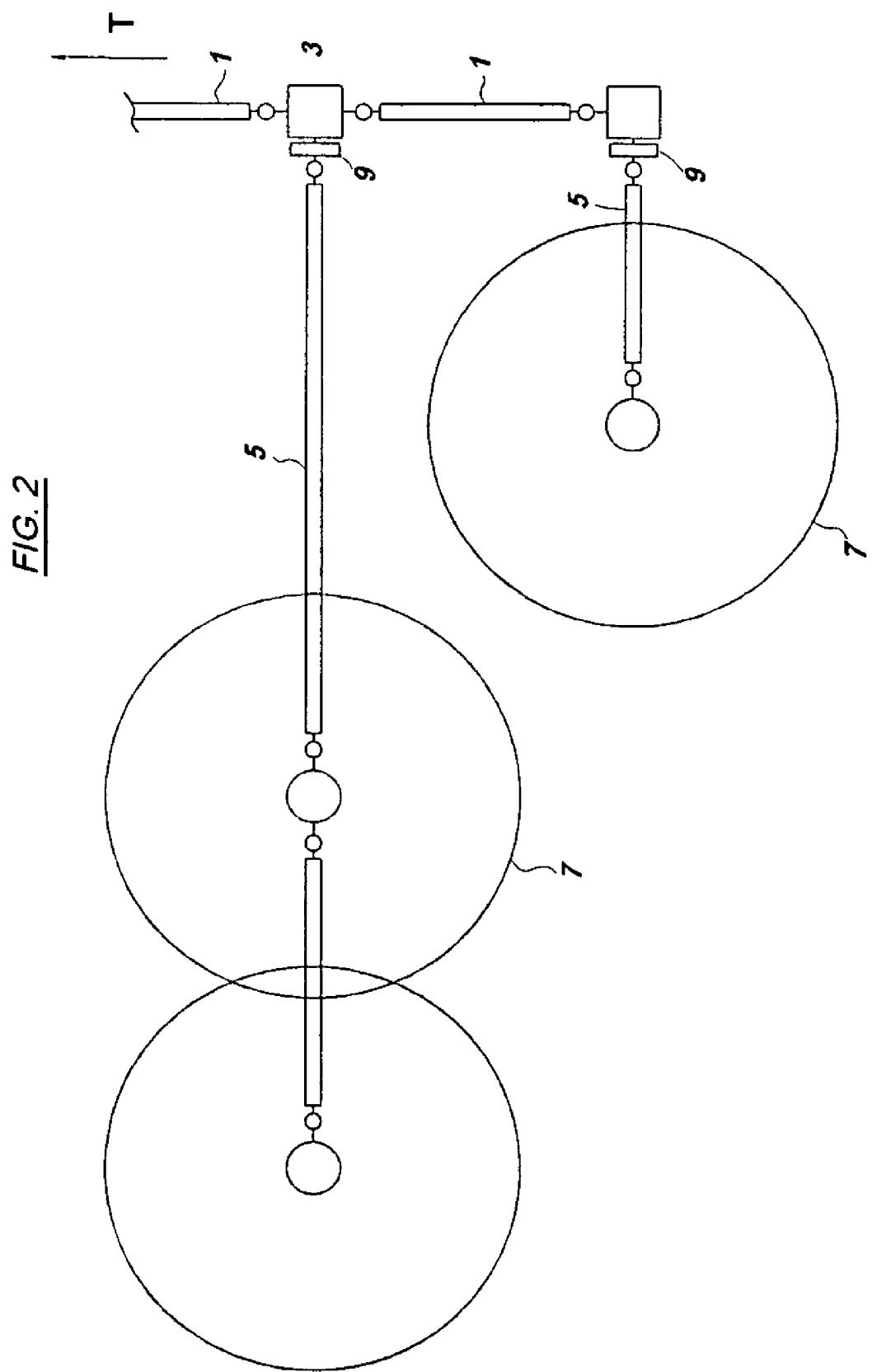
FIG. 2 is a perspective view of the embodiment of FIG. 1 in an operating position.

FIGS. 1-4 illustrate an embodiment of rotary mower apparatus I of the present invention adapted for operation in an operating travel direction T. The apparatus comprises a center section 3 comprising a center deck 5 and a center blade 6 mounted under the center deck 5 and driven through a center gear box 7 mounted on the center deck 5. Inner wings 9 comprise inner wing decks 11 pivotally attached at inner edges thereof to corresponding outer edges of the center section 3, and inner and middle blades 13, 15 mounted under each of the inner wing decks 11 that are driven through corresponding inner and middle gear boxes 17, 19 mounted on the inner wing decks 11.

Outer wings 21 comprise outer wing decks 23 pivotally attached at inner edges thereof to corresponding outer edges of the inner wings 9, and an outer blade 25 mounted under each of the outer wing decks 23 and driven through outer gear boxes 27 mounted on the outer wing decks 23.

In the illustrated embodiment, the rotational axes of the blades, as indicated by the location of the gear boxes 7, 17, 19, 27 are oriented alternately forward and rearward across a width of the apparatus 1. The center blade axis at the center gear box 7 is forward, the inner blade axes at the inner gear boxes 17 are rearward, the middle blade axes at the middle gear boxes 19 are forward, and the outer blade axes at the outer gear boxes 21 are rearward. By alternating the blades forward and rearward across the width, overlap is achieved, and yet the overall length of the apparatus 1 from front to rear is minimized, compared to orienting the blade axes in a V-shape from front to back. It is contemplated that the illustrated configuration, with four of the seven blades rearward, will also give the most even spread of cut material rearward of the apparatus 1.

A plurality of rear wheels 29 are operative to support rear ends of the decks 5, 11, 23 and are typically hydraulically controlled to raise and lower the mower decks. In the illustrated embodiment, gauge members, illustrated as castering gauge wheels 31 are operative to support front portions of the outer wings 2. It is contemplated that a skid or the like could possibly be used as a gauge member as well where it is required to support the front portions of the outer wings. In the illustrated configuration the gauge wheels 31 are located on the outside front corner of the inner wing 9, to which the outer wings 21 are attached. The gauge wheels 31 and rear wheels 29 can be linked to raise and lower front and rear ends of the apparatus 1 together to maintain the mower substantially level.

Figure 3:
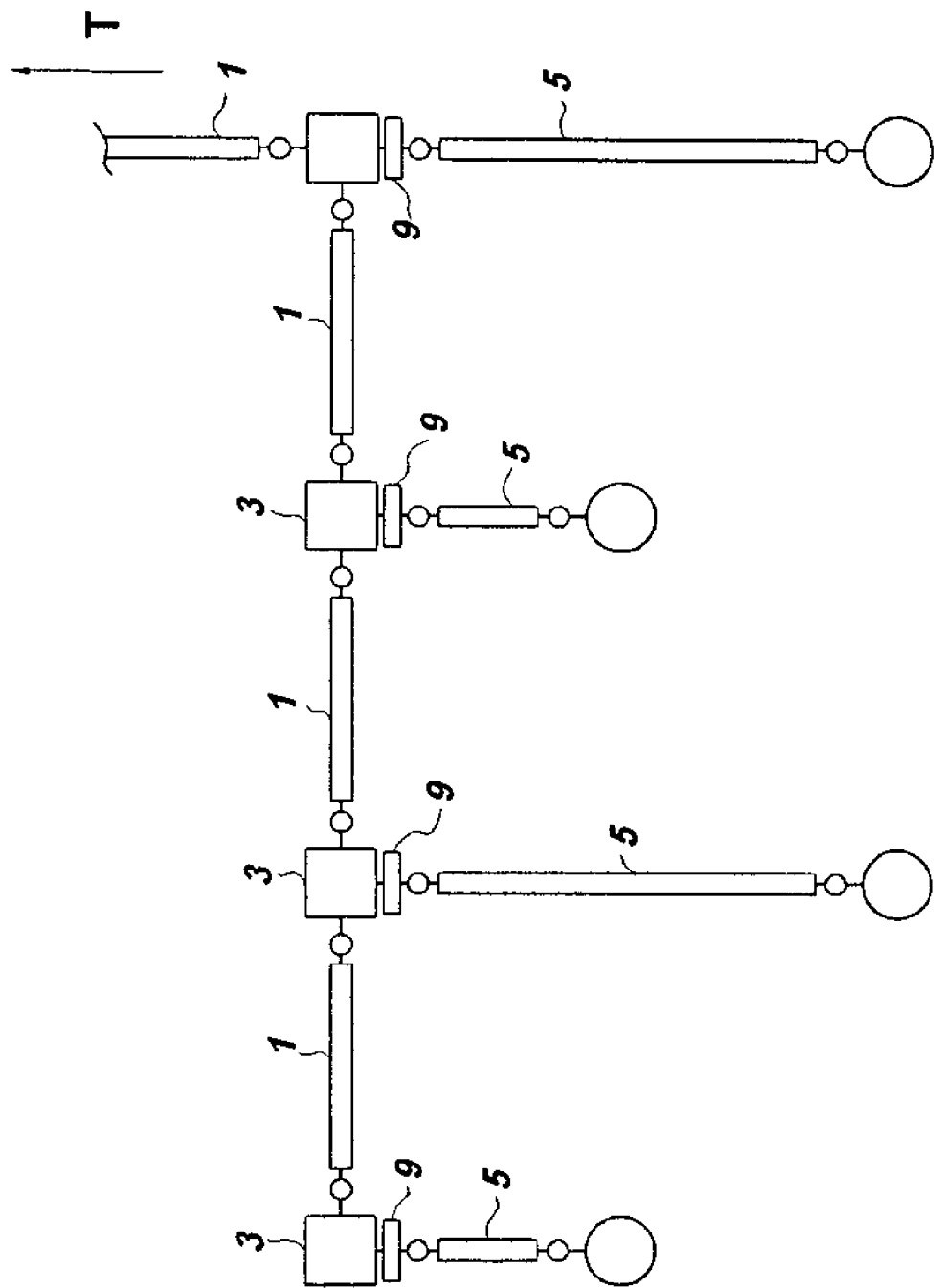
FIG. 3 is a perspective view of the embodiment of FIG. 1 with outer wings in a transport position folded over the inner wings.
Figure 4:
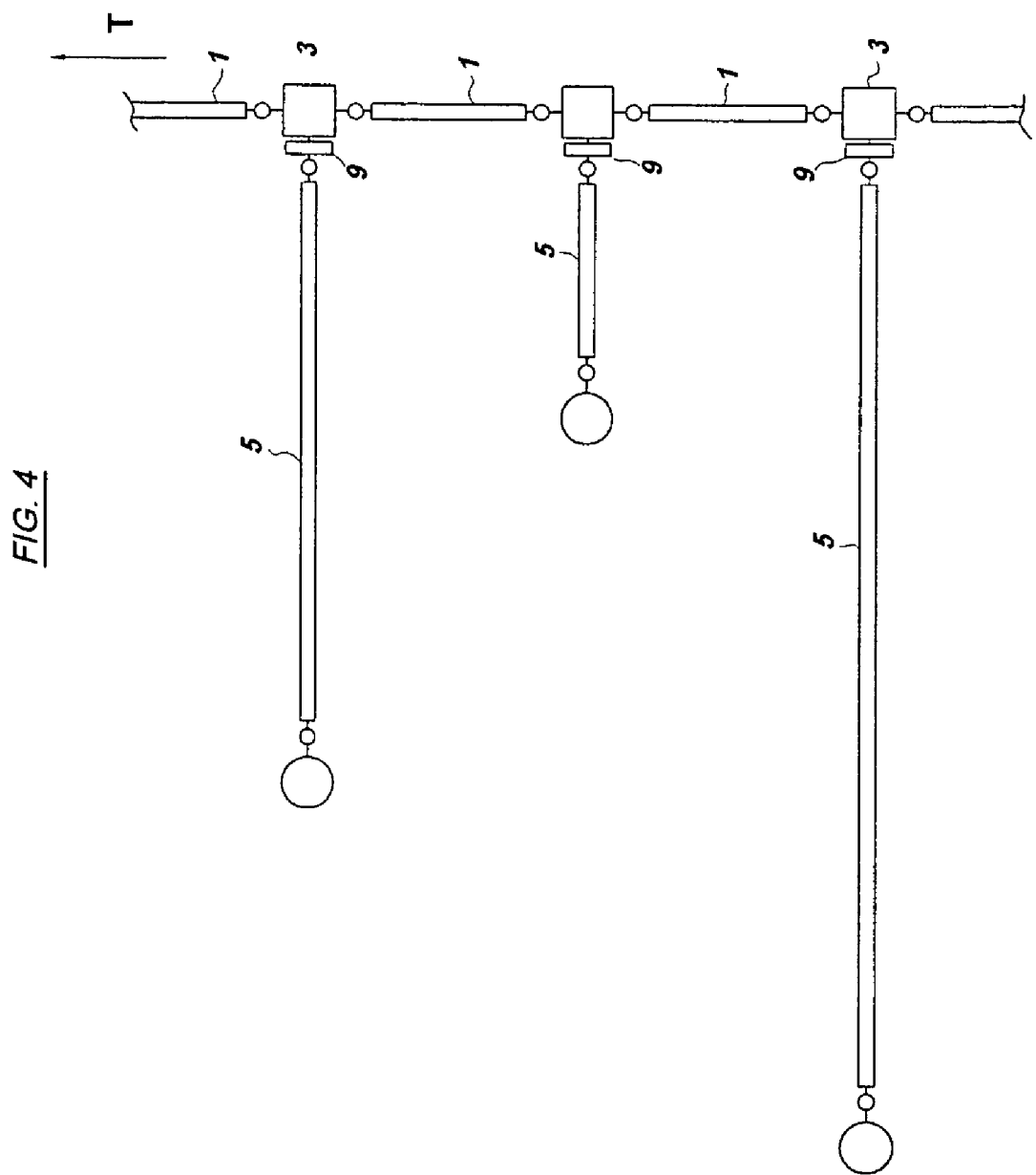
FIG. 4 is a perspective view of the embodiment of FIG. 1 with inner and outer wings in the transport position.

A transport mechanism, which typically will comprise a plurality of appropriate hydraulic cylinders, is operative to fold the outer wings 21 upward to a transport position over the inner wings 9 as illustrated in FIG. 3, and is operative to then fold the inner wings 9 to a transport position oriented substantially upright from outer edges of the center section 3 as illustrated in FIG. 4. In the illustrated embodiment the outer wings 21 fold over the inner wings 9 to lie at an angle in a transport position that is less than about 25 degrees, generally between 15 and 20 degrees with respect to the inner wing 9, such that the outer wings 21 are fairly close to and generally above the inner wings 9. This orientation allows the inner wings 9 to fold to the upright orientation extending up from outer edges of the relatively narrow center section 3 with the outer wings 21 lying between the right and left upright outer wings 21.

The apparatus 1 includes a drive is operative to rotate each blade. In the illustrated embodiment the drive comprises a main gear box 33 attached to the hitch 35 of the apparatus 1 and adapted at an input 37 thereof for attachment to a rotating power source, typically as illustrated the power take off of a towing tractor 39. The main gear box 33 transfers the rotation of the input 37 to three outputs 41. Power shafts are connected to each output 41 of the main gear box 33 to drive the blades. Each blade is driven by a power shaft that includes a slip clutch to provide protection for the driveline and blades.

In the illustrated embodiment, a center power shaft 43 is connected to a main gear box output 41 at a first end thereof and is connected at an opposite second end thereof to the center gear box 7, and a slip clutch 45 in the center power shaft 43 is operative to drive the center blade 6. Right and left power shafts 47 are each connected to a main gear box output 41 at a first end thereof and are connected at opposite second ends thereof to an to input 49 of a T-gear box 51 mounted on a corresponding inner wing deck 11. The T-gear boxes 51 each have two outputs 53. An inner power shaft 55 is connected to the first output 53 of each T-gear box 51 at a first end thereof and is connected at an opposite second end thereof to the corresponding inner gear box 17, and a slip clutch 57 in each inner power shaft 55 is operative to drive the inner blade 13.

A middle power shaft 59 is connected to the second output 53 of each T-gear box 51 at a first end thereof and is connected at an opposite second end thereof to the corresponding middle gear box 19. The middle gear boxes 19, in addition to driving the middle blades 15, each include an output 63 to drive the outer blade 25, and a slip clutch 61 in each middle power shaft 59 is operative to drive the middle and outer blades 15, 25. An outer power shaft 65 is connected to the output 63 of each middle gear box 19 at a first end thereof and is connected at an opposite second end thereof to the corresponding outer gear box 27, and a slip clutch 67 in each outer power shaft 65 is operative to drive the outer blade 25. In the illustrated embodiment the outer power shafts 65 include three telescoping shaft sections instead of the more usual two, in order to enable the outer wing 21 to fold to the transport position of FIG. 4, and also unfold to the operating position of FIG. 2.

Thus the slip clutch 45 in the center power shaft 43, the slip clutches 57 in the inner power shafts 55, and the slip clutches outer power shafts 65 each must transfer sufficient torque to operate a single blade. The slip clutches 61 in the middle power shafts 59 must transfer sufficient torque to drive two blades, as is known in the prior art three section mowers. Thus with the illustrated drive configuration, no slip clutch is thus required to transmit sufficient torque to operate more than two blades.

The T-gear boxes 51 are not connected directly to a blade thereunder, and the right and left power shafts 47 driving them do not require a slip clutch. Slip clutch protection is provided in the power shafts driven from the outputs 53 of the T-boxes 51.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary mower apparatus for operation in an operating travel direction, the apparatus comprising:

a center section comprising a center deck and a center blade mounted under the center deck and driven through a center gear box mounted on the center deck;

right and left inner wings comprising right and left inner wing decks pivotally attached at inner edges thereof to corresponding right and left outer edges of the center section, and inner and middle blades mounted under each of the right and left inner wing decks and driven through corresponding inner and middle gear boxes mounted on the inner wing decks;

right and left outer wings comprising right and left outer wing decks pivotally attached at inner edges thereof to corresponding right and left outer edges of the right and left inner wings, and an outer blade mounted under each of the right and left outer wing decks and driven through outer gear boxes mounted on the outer wing decks;

a plurality of rear wheels operative to support rear ends of the decks;

a transport mechanism operative to fold the outer wings upward to a transport position over the inner wings, and operative to then fold the inner wings to a transport position oriented substantially upright from outer edges of the center section; and a drive operative to rotate each blade, the drive comprising a main gear box adapted at an input thereof for attachment to a rotating power source, and including a plurality of outputs;

a center power shaft connected to a main gear box output at a first end thereof and connected at an opposite second end thereof to the center gear box, and a slip clutch in the center power shaft operative to drive the center blade;

right and left power shafts, each connected to a main gear box output at a first end thereof and connected at an opposite second end thereof to a corresponding one of right and left T-gear boxes mounted on the corresponding right and left inner wing decks, the T-gear boxes each having first and second outputs;

an inner power shaft connected to the first output of each T-gear box at a first end thereof and connected at an opposite second end thereof to the corresponding inner gear box, and a slip clutch in each inner power shaft operative to drive the inner blade;

a middle power shaft connected to the second output of each T-gear box at a first end thereof and connected at an opposite second end thereof to the middle gear box, the middle gear box including an output, and a slip clutch in each middle power shaft operative to drive the middle and outer blades; and an outer power shaft connected to the output of each middle gear box at a first end thereof and connected at an opposite second end thereof to the outer gear box, and a slip clutch in each outer power shaft operative to drive the outer blade.

2. The apparatus of claim 1 wherein rotational axes of the blades are oriented alternately forward and rearward across a width of the apparatus.

3. The apparatus of claim 2 wherein the center blade is forward, the inner blades are rearward, the middle blades are forward, and the outer blades are rearward.

4. The apparatus of claim 1 wherein the outer power shafts include three telescoping shaft sections.

5. The apparatus of claim 1 wherein rotational axes of the blades are oriented alternately forward and rearward across a width of the apparatus.

6. The apparatus of claim 5 wherein the center blade is forward, the inner blades are rearward, the middle blades are forward, and the outer blades are rearward.

7. The apparatus of claim 1 wherein the outer wing folds over the inner wing to lie at an angle in the transport position such that a top surface of the outer wing is oriented at an angle of less than 25 degrees with respect to a top surface of the inner wing.

8. The apparatus of claim 1 comprising right and left gauge members operative to support front portions of the corresponding right and left outer wings.

9. The apparatus of claim 1 where in the transport position the outer power shafts remain connected to the corresponding middle and outer gear boxes.

10. A rotary mower apparatus for operation in an operating travel direction, the apparatus comprising:
 a center section comprising a center deck and a center blade mounted under the center deck and driven through a center gear box mounted on the center deck;
 inner wings comprising inner wing decks pivotally attached at inner edges thereof to corresponding outer edges of the center section, and inner and middle blades mounted under each of the inner wing decks and driven through corresponding inner and middle gear boxes mounted on the inner wing decks;
 outer wings comprising outer wing decks pivotally attached at inner edges thereof to corresponding outer edges of the inner wings, and an outer blade mounted under each of the outer wing decks and driven through outer gear boxes mounted on the outer wing decks;
 wherein rotational axes of the blades are oriented alternately forward and rearward across a width of the apparatus;
 a plurality of rear wheels operative to support rear ends of the decks;
 gauge wheels operative to support front portions of the outer wings;
 a transport mechanism operative to fold the outer wings upward to a transport position over the inner wings, and operative to then fold the inner wings to a transport position oriented substantially upright from outer edges of the center section;
 a main gear box adapted at an input thereof for attachment to a rotating power source, and including a plurality of outputs;
 a center power shaft connected to a main gear box output at a first end thereof and connected at an opposite second end thereof to the center gear box, and a slip clutch in the center power shaft operative to drive the center blade;
 right and left power shafts, each connected to a main gear box output at a first end thereof and connected at an opposite second end thereof to a T-gear box mounted on a corresponding inner wing deck, the T-gear boxes each having first and second outputs;
 an inner power shaft connected to the first output of each T-gear box at a first end thereof and connected at an opposite second end thereof to the corresponding inner gear box, and a slip clutch in each inner power shaft operative to drive the inner blade;
 a middle power shaft connected to the second output of each T-gear box at a first end thereof and connected at an opposite second end thereof to the corresponding middle gear box, the middle gear box including an output, and a slip clutch in each middle power shaft operative to drive the middle and outer blades; and
 an outer power shaft connected to the output of each middle gear box at a first end thereof and connected at an opposite second end thereof to the corresponding outer gear box, and a slip clutch in each outer power shaft operative to drive the outer blade.

11. The apparatus of claim 10 wherein the outer power shafts include three telescoping shaft sections.

12. The apparatus of claim 11 wherein the center blade is forward, the inner blades are rearward, the middle blades are forward, and the outer blades are rearward.

13. The apparatus of claim 10 wherein the outer wing folds over the inner wing to lie at an angle in the transport position such that a top surface of the outer wing is oriented at an angle of less than 25 degrees with respect to a top surface of the inner wing.

14. The apparatus of claim 10 where in the transport position the outer power shafts remain connected to the corresponding middle and outer gear boxes.

* * * * *